Feb. 7, 1956  C. H. NEHLS  2,733,831
CLOSURE CONSTRUCTION
Filed Sept. 24, 1949

INVENTOR.
Charles H. Nehls.
BY
Harness, Dickey & Pierce
ATTORNEYS.

United States Patent Office 2,733,831
Patented Feb. 7, 1956

2,733,831
CLOSURE CONSTRUCTION
Charles H. Nehls, Detroit, Mich.
Application September 24, 1949, Serial No. 117,659
7 Claims. (Cl. 220—46)

This invention relates to removeable and replaceable cap-type closures for tanks and other receptacles.

An important object of the invention is to provide a cap of the indicated character incorporating a uniquely constructed and mounted rubberlike ring member which functions as friction-imposing, take-up and anti-rattle spring means of highly effective character, and which also functions as an efficient gasket.

An object related to that last stated is to provide in such a cap an improved intergral, resilient combined spring and gasket structure and supporting means thereof which is of simple and rugged construction and which is so designed that the spring action, and the sealing effect of the gasket, are effective throughout substantial axial travel of the cap.

A further object is to provide such an improved structure which is so designed as initially to eliminate any possibility of unwanted distortion or cocking of any part of the spring-gasket ring in a manner which would interfere with effective operation or sealing.

Still another object is to provide an improved cap of the indicated character which is adapted to incorporate locking mechanism designed for key release, and which is economical to construct and assemble but of strong and secure character so that the locking means effectively resists unauthorized removal of the cap.

Still another object is to provide an improved dust cover for protecting the keyhole of such a locking cap against entrance of dirt, moisture and other foreign matter.

Other objects and advantages of the invention will become apparent upon consideration of the present disclosure in its entirety.

Figure 1:
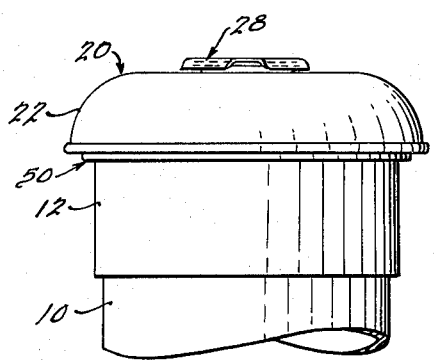
Figure 1 is a side elevational view of a locking cap constructed in accordance with the present invention, showing the same installed upon a fragmentarily-illustrated filler neck such as that of an automobile gasoline tank.

Referring now to the drawings, refernce character 10 designates the neck of a receptacle, which may be considered to be the filler neck of the gasoline tank of a motor vehicle, although it will be understood that my invention is applicable to many other uses. The neck is shown as provided at its outer end with a finishing ring 12 which projects slightly beyond the end of the neck proper and is turned inwardly thereover to provide a substantially flat-topped flange 14. Flange 14 is partially cut away at diametrically opposed positions, as indicated at 15, 16. Such cutaway portions have inclined downturned margins and are of a form commonly provided on automobile gasoline tank filler necks to permit the application of a cap of the bayonet locking type, although the cap of the present invention is not of the bayonet locking type, and such neck construction is merely shown in order to illustrate the applicability of my improved cap thereto.

The cap incorporates a body portion generally designated 20, which may be formed as a die-casting and which is provided with a belled skirt 22, spacedly overhanging the neck. While the shape of the outer surface of the skirt 22 is subject to variation, the inner surface 23 thereof is preferably so contoured that it constitutes approximately one-fourth of a torus. In the preferred construction shown, the outer surface is smooth and parallel to the inner surface 23, although as stated this may be varied to suit the wishes of the designer.

A centrally disposed depending holding portion 25 of the body is adapted to project into the filler neck. Such central portion of the body houses an axially disposed lock cylinder 26 which is rotatable in the body through the agency of key means (not shown), the upper, key-receiving end of the cylinder being exposed at the top of the cap, but adapted to be covered by a dust cover, generally designated 28. The dust cover construction will presently be considered in greater detail.

At its lower end the lock cylinder is formed with a pair of projecting lugs 30, 31. Lug 30 projects into an actuating notch 32 in a latch bolt 34, while lug 31 projects into a similar notch 35 in a latch bolt 36. The latch bolts 34, 36 are slidable in slideways 37, 38, respectively, formed in the body portion 25 and are urged outwardly in opposite directions by compression springs 40, 42, respectively, which normally project the bolts to positions in which they extend outwardly from the sides of the body holding portion 25 and are adapted to underlie the filler neck flange portions 14 to prevent removal of the cap. The bolts are simultaneously retractable to permit removal of the cap in response to rotation of the lock cylinder. The bolts are held in the open-bottomed slideways 37, 38 by means of cupped retainer 44 which is secured to the body as by screws 45. The retainer cup is cutaway to expose the parts of the body in which the latch bolts are slidable and the cup and body portion 25 complement one another to form a substantially cylindrical depending central holding or plug section which projects into the filler neck. The retainer cup is also provided with laterally projecting side portions 46, 47 adapted to extend into the cutout areas 15, 16 of the flange 14. The projecting portions 46, 47 key the cap against rotating with respect to the filler neck and assure proper positioning of the cap upon the filler neck in such manner that the bolts will underengage the wider portions of the flange 14 between the cutout areas.

Figure 5:
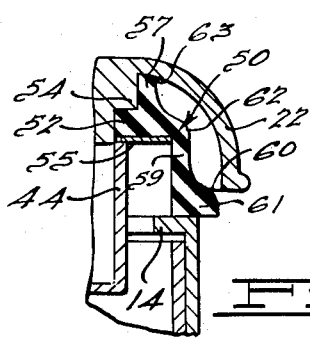
Fig. 5 is a fragmentary vertical and substantially radial sectional view of the spring-gasket element and adjacent portions of the cap and neck, showing the cap in place, but released and the gasket uncompressed.

Housed in skirt portion 22 of the cap is a combined gasket and spring element generally designated 50, formed of soft rubber-like material, preferably of a synthetic character, which will be unaffected by the fuel or material to be stored in the tank and which is of the cross-sectional contour indicated in Fig. 5. Near its upper end the gasket-spring element 50 is provided with a relatively flat radially inwardly projecting flange 52 which is adapted to extend into the space beneath an internal shoulder 54 formed in the cap at the juncture between the skirt 22 and the depending central portion 25. A metallic thrust washer 55 bears against the flat lower face of the shoulder portion 52 and may be held in place by the cup 44. The lower face of the flanged portion 52 is somewhat wider in a radial direction than the upper face, so that the gasket-spring member is generally of a modified inverted L-shaped. The upper end of the gasket is in the form of a flange portion 57 which is substantially cylindrical in shape and which bears against the outer cylindrical surface of the internal shoulder 54 of the cap. An integral flange 59 of generally cylindrical form and which is concentrically positioned extends downwardly from the angular flanges 52, 57 in spaced relation to both the skirt 22 and central body portion 25 and cup 44. Portion 59 is graduated to increased thickness in a radial direction toward the bottom and at its lower extremity is provided with a substantially thickened, outwardly projecting flat-bottomed pad portion 61 adapted to bear downwardly against the top of the neck flange 14. When the gasket is relaxed, the annular pad portion 61 projects somewhat below the skirt 22 in the preferred construction shown, but it will be noted that the pad portion is of less diameter than the skirt and that even with the gasket in its relaxed condition, the rounded upper corner 60 of the pad portion 61 lies close to the belled portion of the cap. The outer surface of the gasket portion joining the top flange 57 to the bottom pad portion 61 is of peripherally wavular form, and may be described as generally frusto-conic and having a central peripheral rib 62 overlying the periphery of the thrust washer 55. The maximum diameter of the bottom pad 61 being greater than that of the top flange 57, such wavular outer surface portion also tapers inwardly to reduced diameter toward the top.

Figure 3:
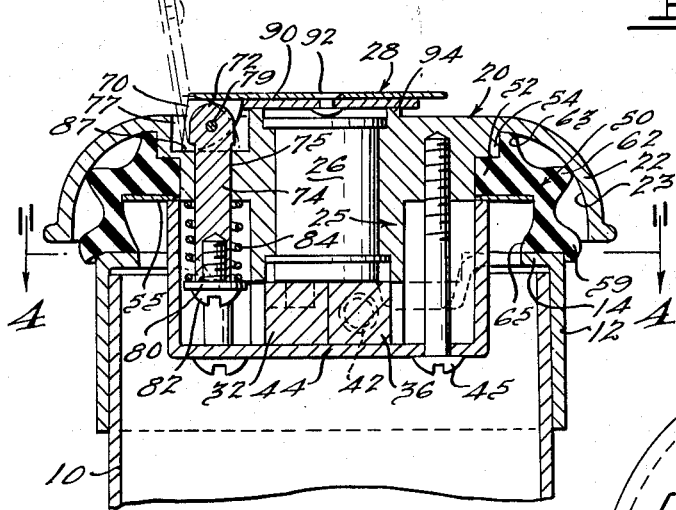
Fig. 3 is a vertical sectional view taken substantially on the line 3—3 of Fig. 2 and looking in the direction of the arrows.
Figure 4:
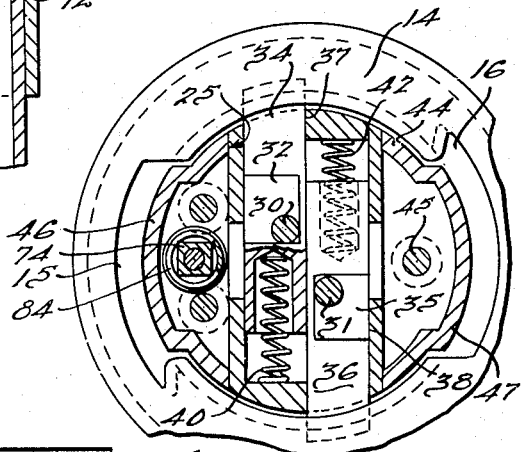
Fig. 4 is a horizontal sectional plan view taken substantially on the line 4—4 of Fig. 3 and looking in the direction of the arrows.

In the preferred gasket form shown in the drawing, the form of the outer surface is such that it contains only the single complete annular wave having the rib-defining bulge or crest portion 62, of rounded cross section, located substantially midway between the upper and lower edges of the gasket-spring and projecting angularly outwardly and upwardly toward the interior of the skirt, being joined to the upper and lower extremities by the trough portions of the wavular section. The curved corner portion 60 corresponds to a crest portion of another but incomplete wave. When the gasket-spring element is relaxed, as in Fig. 5, the rib portion 62 is substantially spaced from the inner surface of the skirt 22. When the cap is pushed downwardly on the filler neck far enough to cause the latch bolts to underengage the neck flange 14, the vertical compressive force exerted upon the gasket-spring element causes the outer wavular portions to tend to move together like the sections of a bellows, so that in effect the wave length is reduced, and the rib 62 tends to bulge outwardly and may engage the inner surface 23 of the skirt, as shown in Fig. 3. The bulge 62 and adjacent parts of the gasket-spring 50 are also kept from folding inwardly by the thrust washer 55. The outwardly projecting flat wall portion of the gasket-spring member, just above the washer 55, tends to bend like a diaphragm, although substantial upward movement thereof is prevented by rib 57 while cylindrical portion 59 is axially compressed, moving the bulge 62 upwardly and outwardly substantially from the position shown in Fig. 5 to that shown in Fig. 3, where it engages the belled cover wall or skirt 22. Such engagement confines the outer surface of the gasket-spring element against further outward distortion, but by reason of the fact that the areas of engagement between the interior of the skirt and the exterior of the gasket-spring element are relatively small, the gasket-spring element is capable of being compressed without creating undue frictional resistance by reason of engagement between such element and the interior of the skirt, despite the effectiveness of the skirt in confining such gasket-spring element. Conversely, when the cap is released, the limited engagement between such gasket-spring element and the interior of the skirt, and the form of such engaging surfaces, permits the gasket-spring element to extend itself axially downwardly without substantial interference by the skirt, so that the spring-like action resulting from the resiliency of the rubber is substantially unhampered by such frictional engagement. The annular pad portion 61 is also free to expand radially inwardly, as indicated at 65, since the pad portion of the gasket is substantially larger in diameter than the cup portion 44. Such inwardly expansion of the gasket is clearly shown in Fig. 3.

The dust cover 28 for the lock cylinder 26 may be stamped of sheet metal and is provided with a pair of substantially parallel, laterally spaced, downwardly turned ears 70 at one edge which extend upon either side of and are pivoted to a perforated head portion 72, formed upon a stem 74 vertically slidable in a hole 75 in the body. The ears 70 are pivotally connected to the head portion 72 by a hinge pin 79. The head portion 72 of the stem, and the ears 70, are largely housed within an open-topped depression or well 77 formed in the top of the body at one side of and slightly spaced from the lock cylinder. Depression 77 has a flat bottom, and such depression as well as the body of the cup-supporting stem 74, and the hole 75, may be of square or other non-circular cross section, so that the dust cover is effectively keyed against rotation about the axis of the stem 74. Stem 74 projects downwardly from the body into the space within the cup 44, where it carries an abutment washer 80 secured to the lower end of the stem as by means of the screw 82, and a helical compression spring 84 which, reacting downwardly against the abutment washer 80, draws the stem 74 and connected dust cover downwardly.

Figure 2:
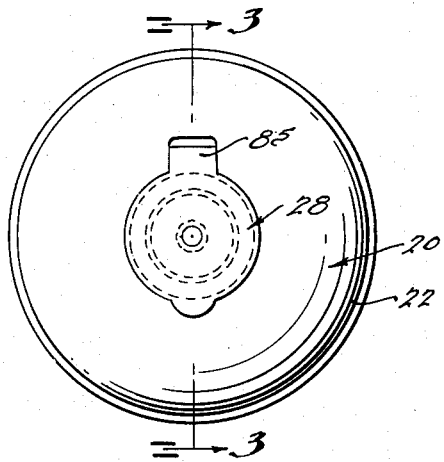
Fig. 2 is a top plan view of the same.

The ears 70 are of generally sector shape, transversely aligned, and somewhat more than 90° in extent, one radial side of each sector being substantially coincident with the plane of the dust cover, while the other radial side extends angularly downwardly and outwardly when the dust cover is closed, as shown in Fig. 3. The part of the dust cover which supports the ears may, as best shown in Fig. 2, comprise a substantially radial lug-like extension 85 which is substantially coplanar with the remainder of the cap. Outer corner portions 87 of the ears 70 bear downwardly against the flat bottom of the well 77 and, when the cap is closed, lie outside of a transverse plane projected parallel to the stem 84 and which includes the hinge pin 79.

The reaction due to the downward force exerted through the hinge pin 79 upon the ears 70 as a result of the effort of the spring 84 results in an upward component in the form of a reaction upon the corners 87 of the ears 70 at their points of engagement with the bottom of the well 77. Such upward component tends to rock the cap in a clockwise direction about the pin 79, as the parts are viewed in Fig. 3, so that the cap is spring-urged toward the closed position so long as the corners 87 lie outside a vertical plane coinciding with the path of vertical movement traveled by the hinge pin 79 during sliding movement of the stem 74. When the cap is raised to a position such that the corners 87 move inwardly past and to a position in which they lie inside such vertical plane of movement of hinge pin 79, the effort exerted by the spring 84 induces movement of the cap in the opposite direction and tends to snap it toward and retain it in the open position shown in broken lines in Fig. 3. During opening and closing movement of the dust cover, the corners 87 travel over the flat bottom of the well 77.

A flat resilient sealing gasket 90 is preferably secured to the underside of the dust cover 28 as by the central rivet 92, and when the dust cover is closed, the gasket 90 is adapted to seat against the top edge of an annular rib 94 projecting integrally upwardly from the top of the cap and surrounding the lock cylinder. The increased unit pressure resulting from the reduced surface area of the rib 94 increases the effectiveness of the sealing engagement, as will be appreciated.

The depth of the well 77 is so proportioned to the dimensions of the ears 70 and to the height of the rib 94 that when the dust cover is closed, it lies flat and parallel to the top of the rib 94, although any slight inaccuracy in this respect is offset by the resiliency of the gasket 90.

Considering further the action of the unitary gasket-spring element 50, it will be observed that when this element is in the relaxed condition shown in Fig. 5, the wavular portion 62 projects outwardly somewhat farther than would a hypothetical conic surface described about such element in such manner as to connect the upper and lower outer corners 60, 63. Due to this fact and also because of the relatively large size of washer 55 and of the flat under surface against which it bears, and the fact that the interior of the gasket-spring element below the washer 55 is relieved or hollow so that the entire element is of substantially inverted L-shape, as noted previously, vertical compression resulting from forcing the cap downwardly upon the filler neck causes the entire gasket-spring element to bulge outwardly, so that it assumes more nearly the contour of a conoid and tends to bear outwardly against the inner surface of the skirt 22. Unwanted inward deformation of the gasket-spring element is effectively prevented by this cross-sectional contour, and is further opposed by the washer 55, which, in addition to its function as a retainer, reinforces the entire gasket-spring element in such fashion to insure proper outward bulging thereof in the controlled manner indicated. Due to the relatively long axial travel of the pad portion 61 made possible by this construction, its spring action is very effective and insures not only proper sealing at the lip of the filler neck, but effective holding of the cap against looseness and rattling, despite differences in the dimensions of filler necks upon which the cap may be installed.

While it will be apparent that the preferred embodiment of my invention herein disclosed is well calculated to fulfill the objects and advantages above stated, it will be apparent that the invention is susceptible to variation, modification, and change without departing from the proper scope and fair meaning of the subjoined claims.

What is claimed is:

1. In a cap construction for filler necks and the like in combination with a body and means carried by the body and adapted to extend into a filler neck and to releasably holdingly underengage an abutment portion carried by such a filler neck, a generally tubular, rubberlike gasket-spring element carried by the body and having a free end engageable with the filler neck, said gasket-spring element being relatively thick and having an upper portion secured to said body and extending outwardly substantially radially therefrom and then downwardly to define a substantially cylindrical flange adapted to align with and engage the filler neck, whereby when said element is urged against the neck said upper portion of the element is flexed laterally of itself and the cylindrical flange is compressed axially, said body having a belled cover section overhanging and extending downwardly around said element, and a plurality of longitudinally spaced abutment portions carried by said element and engageable with said cover section to limit axial movement and radial bulging of said element, including an annular rib extending angularly outwardly and upwardly substantially at the juncture of said outwardly extending upper portion of said gasket-spring element and the cylindrical flange thereof, and a radial flange extending outwardly from the free end of said cylindrical flange.

2. A cap construction comprising a rigid body structure including a generally belled body portion, a pluglike portion rigidly secured to and extending downwardly interiorly of, and spacedly within, the belled body portion, and a combined gasket and spring member formed of resilient rubberlike material and having a substantially flat upper flange portion secured with respect to the body structure and a flange portion integral with and secured to the periphery of said flat upper flange portion and at least a part of which extends angularly outwardly and downwardly from said flat upper flange portion between and spaced from both the belled portion and the pluglike portion, said flat upper flange portion being secured with relation to the body structure at a position spacedly below the belled portion, and an outer part of said flat flange portion in the area of juncture thereof with the second mentioned flange portion being free to flex upwardly toward the belled body portion in response to force exerted upon the lower extremity of said second mentioned flange portion.

3. A cap construction as defined in claim 2 wherein said second mentioned inclined flange portion is contoured to bulge outwardly when urged upwardly by force applied to its free end.

4. In a cap construction for filler necks and the like, a rigid body structure including a covering body part and a generally annular holding part rigidly connected to the covering body part and adapted to extend into interfitted relation with a filler neck and including means to releasably holdingly underengage an abutment portion carried by such a filler neck, a rubberlike gasket-spring element formed of relatively thick material and including a generally flat upper flange portion secured to the body structure at a position spaced below said covering body part and extending outwardly and free at its outer end to flex in a direction toward said covering body part, said gasket-spring element having another flange portion integral with and extending downwardly and outwardly from said first mentioned flange portion and adapted to engage and to be flexed by the end of a filler neck, whereby when said gasket-spring element is urged against such a filler neck said second mentioned flange portion is urged axially toward the covering body part and said first mentioned flange portion tends to flex laterally of itself in a direction upwardly toward said covering body part.

5. A construction as defined in claim 4 including an annular riblike portion carried by said gasket-spring element and engageable with the interior of the covering body part in an intermediate area to restrain upward flexure of said element.

6. A construction as defined in claim 4 including an annular riblike portion carried by and extending upwardly from an intermediate portion of said gasket-spring element and engageable with the interior of the covering body part in an intermediate area to restrain upward flexure of said element.

7. A construction as defined in claim 4 including an annular riblike portion carried by said gasket-spring element and extending angularly outwardly and upwardly therefrom substantially at the juncture of said two flange portions and engageable with the interior of the covering body part in an intermediate area to restrain upward flexure of said element.

References Cited in the file of this patent

UNITED STATES PATENTS

| Number | Name | Date |
|---|---|---|
| 293,912 | Reynolds | Feb. 19, 1884 |
| 509,223 | Howell | Nov. 21, 1893 |
| 1,821,308 | Hughes | Sept. 1, 1931 |
| 1,838,639 | Reid | Dec. 29, 1931 |
| 1,888,459 | Greve | Nov. 22, 1932 |
| 1,904,991 | Shoop | Apr. 18, 1933 |
| 1,923,336 | Stant | Aug. 22, 1933 |
| 1,988,044 | Moran | Jan. 15, 1935 |
| 2,079,813 | Podel | May 11, 1937 |
| 2,167,354 | Gavin | July 25, 1939 |
| 2,187,154 | Ingersoll | Jan. 16, 1940 |
| 2,224,385 | Greenberg | Dec. 10, 1940 |
| 2,240,101 | Smith | Apr. 29, 1941 |
| 2,263,653 | Smith et al. | Nov. 25, 1941 |
| 2,266,270 | Roth | Dec. 16, 1941 |
| 2,317,213 | Oliver | Apr. 20, 1943 |
| 2,376,449 | Oliver | May 22, 1945 |
| 2,416,637 | Minella, Jr. | Feb. 25, 1947 |
| 2,443,086 | Turenne | June 8, 1948 |
| 2,466,076 | Bentley | Apr. 5, 1949 |
| 2,478,470 | Eastman | Aug. 9, 1949 |
| 2,503,031 | Davidson | Apr. 4, 1950 |

FOREIGN PATENTS

| Number | Country | Date |
|---|---|---|
| 243,202 | Great Britain | Nov. 26, 1925 |
| 124,257 | Australia | May 13, 1947 |